United States Patent [19]
Ayres

[11] Patent Number: 5,303,821
[45] Date of Patent: Apr. 19, 1994

[54] RESILIENT CLIP ASSEMBLY

[76] Inventor: Donald B. Ayres, 8501 Laramie, Skokie, Ill. 60077

[21] Appl. No.: 972,582

[22] Filed: Nov. 6, 1992

[51] Int. Cl.$^5$ .............................................. B65D 85/24
[52] U.S. Cl. .................................... 206/346; 206/338; 206/345; 29/412
[58] Field of Search ............... 206/338, 343, 345, 346, 206/347; 24/20 W, 20 CW, 23 W; 29/412, 432.2, 433

[56] References Cited

U.S. PATENT DOCUMENTS

| | | |
|---|---|---|
| 3,613,878 | 10/1971 | Langas . |
| 3,711,931 | 1/1973 | Ladouceur et al. .................. 29/412 |
| 3,722,670 | 3/1973 | Plunkett . |
| 3,758,703 | 9/1973 | Golden et al. . |
| 3,845,860 | 11/1974 | Ladouceur et al. ................ 206/338 |
| 4,508,220 | 4/1985 | Pearson . |
| 4,648,158 | 3/1987 | West . |
| 4,791,014 | 12/1988 | West . |

FOREIGN PATENT DOCUMENTS 2023216 12/1979 United Kingdom .

Primary Examiner—David T. Fidei
Attorney, Agent, or Firm—Thomas R. Vigil

[57] ABSTRACT

The resilient clip assembly comprises a plurality of U-shaped clips which are held together by the two non-metal, elongate, flexible members which are securely and mechanically gripped between the metal on each side of each opening in the bight portion of each clip. The method for making the resilient clip assembly includes the steps of: punching clip blanks from a sheet of metal with each blank having two spaced apart openings punched through the metal in the area which will be formed into a bight portion of a U-shaped clip; folding or forming each clip blank around a mandrel to form a U-shaped clip with a bight portion and two leg portions; placing a plurality of the U-shaped clips in a line or row with the openings on one side of the clip aligned with adjacent openings in the adjacent clips to form an elongate trough and with the slot on the other side of each clip aligned with the adjacent slots in the adjacent clips to form a second elongate trough; placing a non-metal, elongate, flexible member in each trough; and sequentially pressing the side edges of the bight portion of each clip toward each other to crimp the plastic wires in the openings of the clip to form the resilient clip assembly.

18 Claims, 1 Drawing Sheet

RESILIENT CLIP ASSEMBLY

BACKGROUND OF THE INVENTION

1. Field of the Invention

The present invention relates to a clip assembly comprising clips having a U-shaped cross-section which are connected together by plastic wires to provide a clip stack for mounting in a magazine of a tool which separates and crimps the clips around metal wires, such as coils of a spring in a mattress or an automobile seat.

2. Description of the Prior Art

Heretofore it has been proposed in U.S. Pat. No. 3,722,670 to provide a clip stack where the clips are held together by two plastic wires and where the plastic wires are pressed into notches in the side edges of a plurality of aligned U-shaped clips to provide the clip stack which is insertable into a magazine of a tool that is adapted to cut each clip from the stack and crimp each U-shaped clip around two or more metal wires or rods.

There has also heretofore been proposed a U-clip assembly in U.S. Pat. No. 4,508,220. This patent teaches a U-shaped clip assembly and method of producing same wherein the clips are held together in an assembly or stack by two metal wires which are welded to the outer bight or crown portion of inverted U-shaped clips.

As will be described in greater detail hereinafter, the resilient clip assembly of the present invention provides a plurality of clips which have generally parallel spaced slots formed transversely of the clip across the outer inverted side of the bight or crown portion of each clip. Then, a plastic wire is inserted in each row of slots in an aligned row of the U-shaped clips. Next, pressure is applied to the side edges of each clip at the bight portion thereof to crimp the metal about each slot partly around the plastic wire received therein.

The resilient clip assembly of the present invention has the advantage that it is easier to form two slots in the inverted bight or crown of the clip than to form four notches in the side edges of a clip, as disclosed in U.S. Pat. No. 3,722,670.

Furthermore, the plastic wire cord is not pinched or mechanically held in the notches of the clip disclosed in U.S. Pat. No. 3,722,670 and is held therein merely by friction.

Still further, due to the location of the notches in the side edges of the clip, the clip stack of U.S. Pat. No. 3,722,670 is not easily adapted to clips of different size, whereas the resilient clip assembly of the present invention can be adapted to any size clip.

With respect to the U-clip assembly disclosed in U.S. Pat. No. 4,508,220, the welding of wires to the outer side of the crown or bight portion of each of the clips in the clip assembly requires a cleaning of the steel, since welding requires clean surfaces.

Furthermore, the steel wire has no memory, and if the strip of clips in the assembly is twisted or deformed, it remains in that condition, which can result in jamming of the clips in the magazine of the tool.

Also, cutting of a metal wire will result in eventual dulling of the cutting element, and it will require replacement. Additionally, wire chips are formed in cutting wires and contaminate automated mattress assembly equipment as disclosed in U.S. Pat. No. 4,829,643 resulting in equipment malfunctions. Still further, the cut wire edges can sometimes be inadvertently engaged by an operator causing injury.

The resilient clip assembly of the present invention avoids these possible limitations of the prior art U-clip assembly disclosed in U.S. Pat. No. 4,508,220.

SUMMARY OF THE INVENTION

According to the present invention there is provided a resilient clip assembly comprising a plurality of U-shaped clips which are connected together by two non-metal elongate flexible members, such as plastic wires. Each clip has a first opening or slot formed in the crown or bight portion thereof and a second, spaced opening or slot formed in the crown or bight portion thereof. The clips are aligned in a row so that the pairs of slots in each clip are aligned with similar slots in adjacent clips. The clips are positioned adjacent to each other with the pairs of slots aligned to form two long troughs and a non-metal elongate flexible member or plastic wire is received in each trough and thereby in each slot in each clip. Pressure is applied sequentially to the side edges of the crown or bight portion of each clip causing the metal in the bight portion between each side edge and each slot to move inwardly to crimp the plastic wire in each slot resulting in a resilient clip assembly held together by two plastic wires which are securely and mechanically gripped between the metal on each side of each slot in the crown or bight portion of each clip.

Further according to the present invention there is provided a method for making a resilient clip assembly including the steps of:

punching clip blanks from a sheet of metal with each blank including two spaced apart openings or slots punched through the metal in the area which will be formed into a bight portion of a U-shaped clip;

forming each clip blank around a mandrel to form the clip with a U-shape including a bight portion and two leg portions;

placing a plurality of such clips in a line or row with the slot on one side of each clip being aligned with adjacent slots in adjacent clips to form an elongate trough and with the slot on the other side of each clip being aligned with adjacent slots in adjacent clips to form a second elongate trough;

placing a non-metal, elongate, flexible member, such as a plastic wire, in each trough; and sequentially pressing the side edges of the bight portion of each clip toward each other to crimp the plastic wires in the slots of each clip to form the resilient clip assembly.

DESCRIPTION OF THE PREFERRED EMBODIMENT

Figure 1:
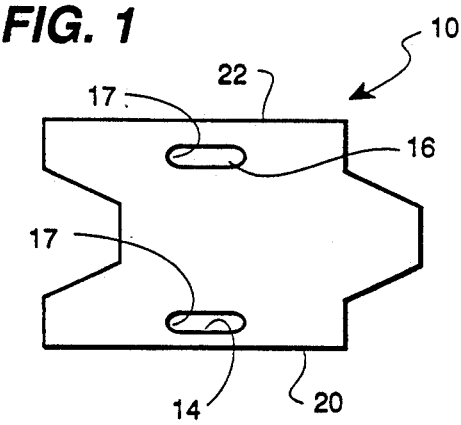
FIG. 1 is a top plan view of a blank from which a clip is formed that has been punched out of a sheet of metal.
Figure 2:
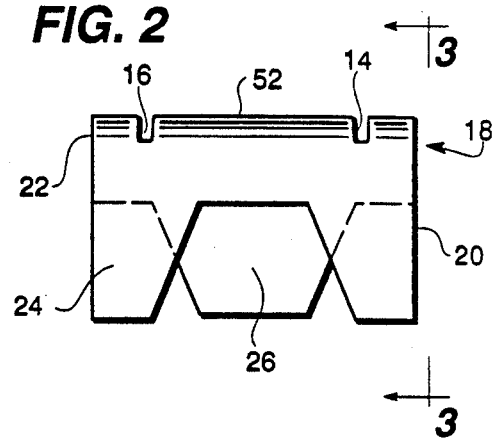
FIG. 2 is a side elevational view of the blank after it has been formed into a U-shape around a mandrel to form a U-shaped clip.

Referring now to the drawings in greater detail, there is illustrated in FIG. 1 a clip blank 10 from which a U-shaped clip 12 (FIG. 2) is formed. As shown, the blank 10 has two spaced apart openings, preferably elongate oval shaped or rounded ended notches or slots 14 and 16, each with two rounded ends 17. The openings or slots 14 and 16 are spaced apart in an area of the blank 10 which is formed into a bight portion 18 (FIG. 3) of the U-shaped clip 12.

The slots 14 and 16 are each positioned adjacent an edge 20 or 22 of the blank 10. Except for the slots 14 and 16, the blank 10 is generally of conventional shape for forming a U-shaped clip by forming or folding the blank 10 around a mandrel (not shown) to form the U-shaped clip 12 shown in FIG. 2.

When the U-shaped clip 12 is formed from the blank 10, it includes the bight portion 18 and first and second leg portions 24 and 26. The bight portion 18 extends from the side edges 20 and 22.

Figure 3:
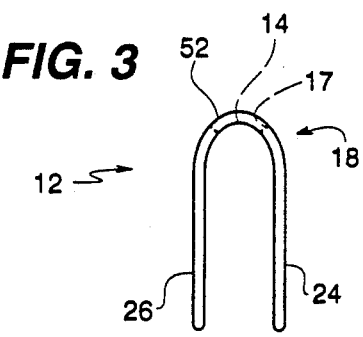
FIG. 3 is an end view of the U-shaped clip and is taken along line 3—3 of FIG. 2.
Figure 4:
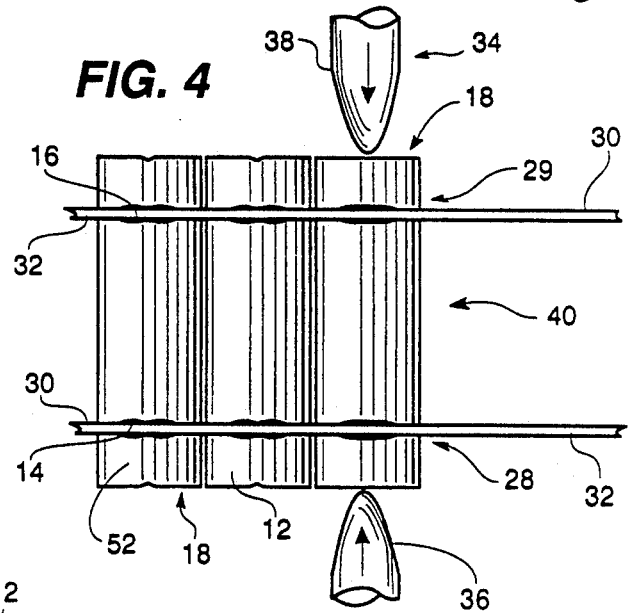
FIG. 4 is a top plan view of three clips aligned side by side in a line or row with a non-metal, elongate, flexible member or plastic wire received in each of two elongate troughs formed by aligned openings or slots in the outer surface of the crown or bight portion of each clip and shows one or two rams which engage the side edges of the bight portion of one clip and at least one of the rams is forced against the other to displace slightly the metal at the side edges of the bight portion to crimp the plastic wires in the slots in the clip.
Figure 5:
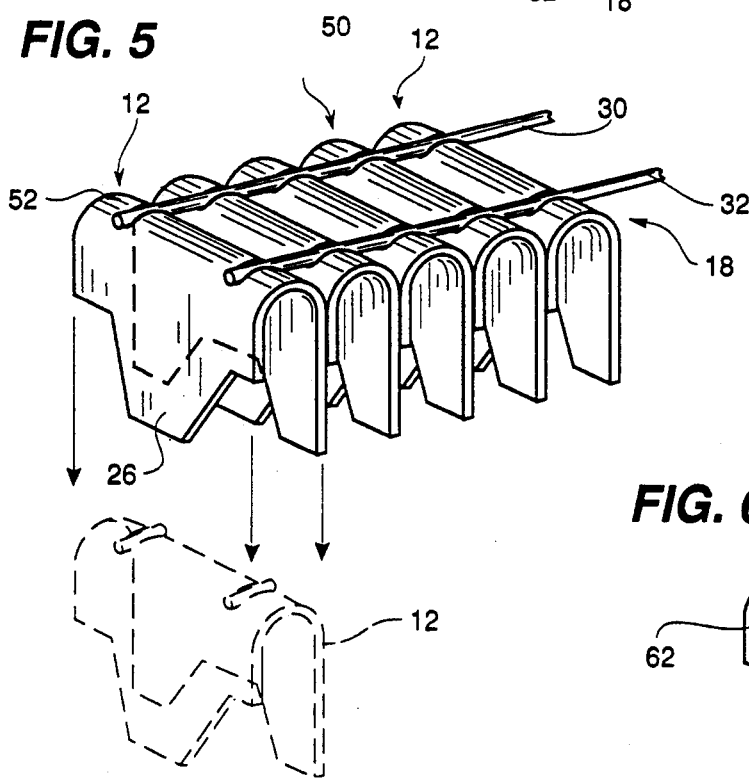
FIG. 5 is a perspective view of the resilient clip assembly of the present invention formed by the squeezing of each clip shown in FIG. 4 and shows in phantom one clip cut away from the assembly.

The bight portion 18 and leg portions 24 and 26 of the U-shaped clip 12 are best shown in FIG. 3.

A plurality of clips 12 are arranged side by side in a line so that the slots 14 in the clips 12 are aligned with each other to form a trough 28 and the slots 16 are aligned with each other to form a trough 29. Then, a non-metal, elongate, flexible member, such as a plastic wire or cord 30, is inserted into the trough 28 defined by the aligned slots 14 and a similar member, plastic wire or cord 32 is placed in the trough 29 formed by the aligned slots 16.

Next, the U-shaped clips 12 with the plastic cords 30 and 32 received in the slots 14 and 16 are moved to a compression station 34 defined by first and second rams 36 and 38. At least one of the rams, and preferably both of the rams 36 and 38, are moved toward each other to move a metal portion 40 between the side edge 20 and the slot 14 and a metal portion 42 between the side edge 22 and the slot 16 in the bight portion 18 of the clip 12 toward each other for the purpose of crimping the plastic cords 30 and 32 in the slots 14 and 16 at the compression station 34. In this way, each of the U-shaped clips 12 in the line or row 40 of clips 12 are secured attached to the plastic wires or cords 30 and 32 thereby to form a resilient clip assembly 50, the resiliency being provided by the flexibility of the plastic cords or wires 30 and 32.

Except for the slots 14 and 16, each of the U-shaped clips 12 is generally of the configuration of the U-shaped clips disclosed in U.S. Pat. No. 4,508,220, the disclosure of which is incorporated herein by reference.

It will be apparent that the resilient clip assembly 50 does not require the cutting of any metal wires, thereby reducing maintenance of the tool with which it is used, such as the tool disclosed in U.S. Pat. No. 4,508,220 or the tool disclosed in U.S. Pat. No. 3,722,670, the disclosure of which is incorporated herein by reference.

By using plastic wires or cords 30 and 32, any type of material can be used for making the clips 12, since nothing is welded to the clips.

Furthermore, it will be appreciated that since the plastic cords or wires 30 and 32 are located in the crown or bight portion 18 of each of the clips 12, clips of different types and sizes can be easily connected utilizing the method of the present invention of passing each clip 12 past a compression station 34. In this respect, the width of each clip 12 between the leg portions 26 and 28 can be of any desired size or width and the dies for punching the clip blank 10 do not have to be altered when the blanks 10 are formed about different sized mandrels to form or fold different sized U-shaped clips 12.

Furthermore, it will be appreciated that when the resilient clip assembly 50 is twisted or bent, it will return to its original shape due to the plastic memory of the plastic wires or cords 30 and 32. As a result, if the resilient clip assembly 50 is twisted, it will return to its original shape for being received in a magazine of a conventional clip separating and crimping tool of the type used in the prior art, as disclosed in the U.S. patents referred to above.

Additionally, when the plastic wires 30 and 32 are cut, there is little, if no chips to form contaminates in an assembly, such as a spring assembly for a mattress or an automobile car seat.

Preferably, at least one or both of the plastic wires or cords 30 and 32 is color coded to indicate a type, style or size of clip 12.

Furthermore, it is to be noted that a lighter U-shaped clip 12 is provided than in the prior art clips due to the reduced weight from the material punched out of the slots 14 and 16 without any resulting weakness in the clip 12, whereby more rolls of clips can be carried per truck load than with prior art clips.

Also, when the resilient clip assembly 50 is rolled into a roll as is conventional in the art, a more dense clip roll is obtained than the clip roll having metal wires welded to the crown of the clip, as disclosed in U.S. Pat. No. 4,508,220.

It is further believed that a resilient clip assembly 50 constructed in the manner described above will result in a rolled clip assembly having an indefinite shelf life of clip fasteners in strip form, since the clips are securely and mechanically held to the plastic wires or cords 30 and 32 by the crimping of the metal adjacent the slots 14 and 16 about the plastic wires or cords 30 and 32. In other words, each plastic wire or cord 30 or 32 is pinched and mechanically captured in each of the lots 14 and 16 when the side edges 20 and 22 are compressed toward each other at the compression station 34.

Still another advantage of the resilient clip assembly 50 of the present invention is that the rounded end 17 of each slot 14 or 16 when the blank 10 is folded or formed around the mandrel creates a sharp edge at an outer surface 52 of the bight portion 18 which will assist in severing the plastic wire or cords 30 and 32 by a cutting element as provided in conventional clip dispensing tools.

Figure 6:
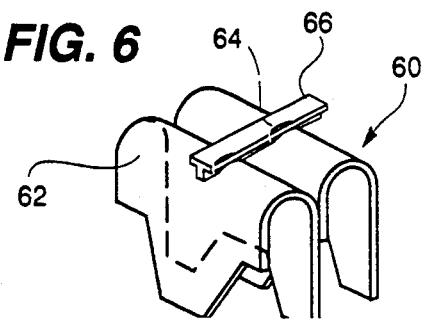
FIG. 6 is a perspective view of a portion of a modified resilient clip assembly of the present invention and shows each clip with one opening or slot therein and a T-in-cross-section, non-metal, elongate, flexible member received in each slot.

From the foregoing description, it will be apparent that the resilient clip assembly 50 and method for making same of the present invention has a number of advantages, a number of which have been described above and others of which are inherent in the resilient clip assembly 50. Also, modifications can be made to the clip assembly 50 and method for making same without departing from the teachings of the invention. For example, as shown in FIG. 6, an assembly 60 can be formed from U-shaped clips 62 each having one opening or slot 64 in the crown or bight portion thereof and the aligned openings or slots 64 having a T-in-cross-section, non-metal, elongate, flexible member 66 received therein. Accordingly, the scope of the invention is only to be limited as necessitated by the accompanying claims.

I claim:

1. A resilient clip assembly comprising a plurality of U-shaped clips which are connected together by two non-metal, elongate, flexible members, each clip including a bight portion and spaced apart leg portions and having a first opening formed in the outer surface of the bight portion thereof and a second, spaced, opening formed in the outer surface of the bight portion thereof, with the clips aligned so that said spaced apart openings in each clip are aligned in a row with similar openings in adjacent clips, and with the pairs of openings in the row of clips being aligned to form two elongate troughs, a non-metal, elongate, flexible, member being received in each trough and thereby in each opening in each clip, the side edges of the bight portion of each clip having been pressed toward each other to cause the metal in the bight portion to be crimped against said non-metal elongate, flexible members resulting in a resilient clip assembly held together by the two non-metal, elongate, flexible members which are securely and mechanically gripped between the metal on each side of each opening in the bight portion of each clip.

2. The resilient clip assembly of claim 1 wherein each opening is an elongate opening having rounded ends.

3. The resilient clip assembly of claim 1 wherein said non-metal, elongate, flexible members are plastic wires or cords.

4. The resilient clip assembly of claim 1 wherein at least one of said non-metal, elongate, flexible members is color coded to indicate a type, style or size of clip.

5. A method for making a resilient clip assembly including the steps of:
punching clip blanks from a sheet of metal with each blank having two spaced apart openings punched through the metal in the area which will be formed into a bight portion of a U-shaped clip;
forming each clip blank around a mandrel to form a U-shaped clip with a bight portion and two leg portions;
placing a plurality of the U-shaped clips in a line or row with the openings on one side of the clip aligned with adjacent openings in the adjacent clips to form an elongate trough and with the opening on the other side of each clip aligned with the adjacent openings in the adjacent clips to form a second elongate trough;
placing a non-metal, elongate, flexible member in each trough; and
sequentially pressing the side edges of the bight portion of each clip toward each other to crimp the non-metal, elongate, flexible members in the opening in each clip to form the resilient clip assembly.

6. The method of claim 5 including the step of: forming each opening with rounded ends.

7. The method of claim 5 including the step of: making each non-metal, elongate, flexible members out of plastic thereby providing a plastic wire or cord.

8. The method of claim 5 including the step of: coloring at least one of said non-metal, elongate, flexible members to provide a color coded member to indicate a type, style or size of clip.

9. A resilient assembly comprising a plurality of U-shaped clips which are connected together by at least one non-metal, elongate, flexible member, each clip including a bight portion and spaced apart leg portions and having at least one opening formed in the outer surface of the bight portion thereof with the clips being aligned so that the opening in each clip is aligned in a row with a similar opening in adjacent clips to form an elongate trough, said at least one non-metal, elongate, flexible member being received in the trough and thereby in each opening, the side edges of the bight portion of each clip having been pressed toward each other to cause metal in the bight portion to be crimped against said non-metal, elongate, flexible member resulting in a resilient clip assembly held together by the at least one, non-metal, elongate, flexible member securely and mechanically gripped between the metal on each side of the opening in the bight portion of each clip.

10. The assembly of claim 1 wherein said non-metal, elongate, flexible member has a T-shaped cross-section.

11. The assembly of claim 9 wherein each opening is an elongate slot having rounded ends.

12. The assembly of claim 9 wherein said non-metal, elongate, flexible member is a plastic wire or cord.

13. The assembly of claim 9 wherein said at least one non-metal, elongate, flexible member is color coded to indicate a type, style or size of clip.

14. A method for making a resilient clip assembly including the steps of:
punching clip blanks from a sheet of metal with each blank having an opening punched through the metal in the area which will be formed into a bight portion of a U-shaped clip;
forming each clip blank around a mandrel to form a U-shaped clip with a bight portion and two leg portions;
placing a plurality of the U-shaped clips in a line or row with the opening in each clip being aligned with adjacent openings in adjacent clips to form an elongate trough;
placing a non-metal, elongate, flexible member in the trough; and
sequentially pressing the side edges of the bight portion of each clip toward each other to crimp the non-metal, flexible member in the opening in each clip to form the resilient clip assembly.

15. The method of claim 14 including the step of: forming said non-metal, elongate, flexible member with a T-shaped cross-section.

16. The method of claim 14 including the step of: forming each opening with rounded ends.

17. The method of claim 14 including the step of: making each non-metal, elongate, flexible members out of plastic thereby providing a plastic wire or cord.

18. The method of claim 14 including the step of: coloring at least one of said non-metal, elongate, flexible members to provide a color coded member to indicate a type, style or size of clip.

* * * * *